(12) United States Patent
Barbier (10) Patent No.: US 10,459,537 B2
(45) Date of Patent: Oct. 29, 2019

(54) ENCAPSULATED PRESSURE SENSOR

(71) Applicant: STMICROELECTRONICS, INC., Coppell, TX (US)

(72) Inventor: Dominique Paul Barbier, Longmont, CO (US)

(73) Assignee: STMicroelectronics, Inc., Coppell, TX (US)

(*) Notice: Subject to any disclaimer, the term of this patent is extended or adjusted under 35 U.S.C. 154(b) by 120 days.

(21) Appl. No.: 15/276,341

(22) Filed: Sep. 26, 2016

(65) Prior Publication Data

US 2017/0090604 A1 Mar. 30, 2017

Related U.S. Application Data

(60) Provisional application No. 62/235,359, filed on Sep. 30, 2015.

(51) Int. Cl.
*G06F 3/0354* (2013.01)
*G06F 3/038* (2013.01)
*G06F 3/0488* (2013.01)
*G06F 3/041* (2006.01)
*G01L 5/22* (2006.01)

(52) U.S. Cl.
CPC ........ *G06F 3/03545* (2013.01); *G01L 5/226* (2013.01); *G06F 3/0383* (2013.01); *G06F 3/0416* (2013.01); *G06F 3/0488* (2013.01); *G06F 2203/04105* (2013.01)

(58) Field of Classification Search
CPC .. G06F 3/03545; G06F 3/0383; G06F 3/0488; G06F 2203/04105; G01L 5/226
See application file for complete search history.

(56) References Cited

U.S. PATENT DOCUMENTS

| | | | | |
|---|---|---|---|---|
| 2012/0065902 | A1* | 3/2012 | Nakajima | B25J 13/085 702/41 |
| 2014/0267182 | A1* | 9/2014 | Fergusson | G06F 3/03545 345/179 |
| 2014/0375573 | A1* | 12/2014 | Idzik | G06F 3/0383 345/173 |
| 2015/0077364 | A1* | 3/2015 | Parthasarathy | G06F 3/016 345/173 |
| 2016/0282970 | A1* | 9/2016 | Evreinov | G06F 3/03545 |

* cited by examiner

*Primary Examiner* — Sahlu Okebato
(74) *Attorney, Agent, or Firm* — Seed Intellectual Property Law Group LLP (57) ABSTRACT

An encapsulated pressure sensor includes a pressure sensor having a pressure sensing surface and a mounting surface. The mounting surface is attached to a mounting substrate. A fluid contacts the pressure sensing surface of the pressure sensor. A deformable encapsulating member is attached to the mounting substrate and encapsulates the pressure sensor and the fluid.

20 Claims, 4 Drawing Sheets

ENCAPSULATED PRESSURE SENSOR

BACKGROUND

Technical Field

This disclosure generally relates to pressure sensors and more particularly to encapsulated pressure sensors for determining a change in pressure due to an applied external force.

Description of the Related Art

Force sensors are commonly utilized in a wide variety of applications. Such force sensors commonly include piezoresistive strain gauges, such as semiconductor strain gauge or metallic strain gauge types. These types of force sensors have certain undesirable issues. For example, semiconductor strain gauge force sensors offer high precision, but are relatively large. Metallic strain gauge force sensors, on the other hand, can be made compact, though this comes with diminished sensitivity. Further, power consumption is an issue with many applications utilizing conventional force sensors.

One application for force sensing is an active stylus or "smart pen," which are commonly used in connection with a host electronic device, such as a tablet computer or smartphone. Such styluses typically use force sensors to assess or measure the amount of pressure a user applies on the pen. This solution is expensive and not very accurate, as conventional force sensors of the size desirable in a stylus are not particularly sensitive to relatively low forces. Ideally, a force sensor in such an application would be able to detect forces applied to a tip of the stylus in the range of 0-300 grams; however, this is often not possible or not effectively achieved through conventional force sensors used in such styluses. Detection of such low forces would allow an active stylus and host electronic device to more accurately mimic the use of, as one example among many, a very light marking with a pen or pencil.

There is thus a need for improved force sensing devices in this, as well as a variety of other, applications.

BRIEF SUMMARY

One or more embodiments are directed to encapsulated pressure sensors that include a pressure sensor (e.g., an absolute pressure sensor) having a pressure sensing surface. The pressure sensor is attached to a mounting substrate, such as a printed circuit board (PCB), and outputs a signal indicating a pressure sensed by the pressure sensing surface. An encapsulating member, which may be, for example, a dome-shaped rubber member, surrounds the pressure sensor and is mounted to the mounting substrate. Additionally, a fluid, such as air, is provided within the encapsulating member, such that an external force applied to the encapsulating member will cause a deformation of the encapsulating member and will increase the fluid pressure that is sensed by the pressure sensing surface of the pressure sensor. Accordingly, the difference between the hydrostatic pressure of the fluid and the pressure against the pressure sensing surface when the encapsulating member is deformed is proportionate to the amount of force applied to the encapsulating member, i.e., an external force. Such encapsulated pressure sensors as provided herein may be utilized in a variety of applications for sensing an applied force, including in an active stylus, pressure-sensitive buttons, robotic gripping devices, and more.

In one embodiment, the present disclosure provides an encapsulated pressure sensor having a pressure sensing surface and a mounting surface. The mounting surface is attached to a mounting substrate. The encapsulated pressure sensor further includes a fluid that contacts the pressure sensing surface of the pressure sensor. A deformable encapsulating member is attached to the mounting substrate and encapsulates the pressure sensor and the fluid.

In another embodiment, the present disclosure provides a method that includes providing an encapsulated pressure sensor having a pressure sensor including a pressure sensing surface and a mounting surface, the mounting surface being attached to a mounting substrate, a fluid contacting the pressure sensing surface of the pressure sensor, and a deformable encapsulating member, the deformable encapsulating member being attached to the mounting substrate and encapsulating the pressure sensor and the fluid. The method further includes sensing by the pressure sensor a pressure exerted on the pressure sensing surface by the fluid in an equilibrium state, and sensing by the pressure sensor an increase in pressure exerted on the pressure sensing surface by the fluid due to an external force exerted on the deformable encapsulating member.

In yet another embodiment, the present disclosure provides a system that includes a movable gripping device including an encapsulated pressure sensor configured to sense a gripping force. The encapsulated pressure sensor includes a pressure sensor having a pressure sensing surface and a mounting surface, the mounting surface being attached to a mounting substrate, a fluid contacting the pressure sensing surface of the pressure sensor, and a deformable encapsulating member attached to the mounting substrate and encapsulating the pressure sensor and the fluid. The system further includes a controller coupled to the encapsulated pressure sensor and to the one or more motors, the controller being configured to receive a signal indicative of the sensed gripping force and to control a movement of the movable gripping device based on the sensed gripping force.

In still another embodiment, the present disclosure provides a method that includes: attaching a first surface of a pressure sensor to a mounting substrate; exposing a second surface of the pressure sensor to a fluid, the second surface being opposite to the first surface; and attaching a deformable encapsulating member to the mounting substrate, the deformable encapsulating member encapsulating the pressure sensor and the fluid.

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility. Further, the particular shapes of the elements as drawn are not intended to convey any information regarding the actual shape of the particular elements and have been selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Well-known structures associated with fabrication of pressure sensing devices have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and are not to be used to interpret the meaning of the embodiments or scope of the claims.

Figure 1:
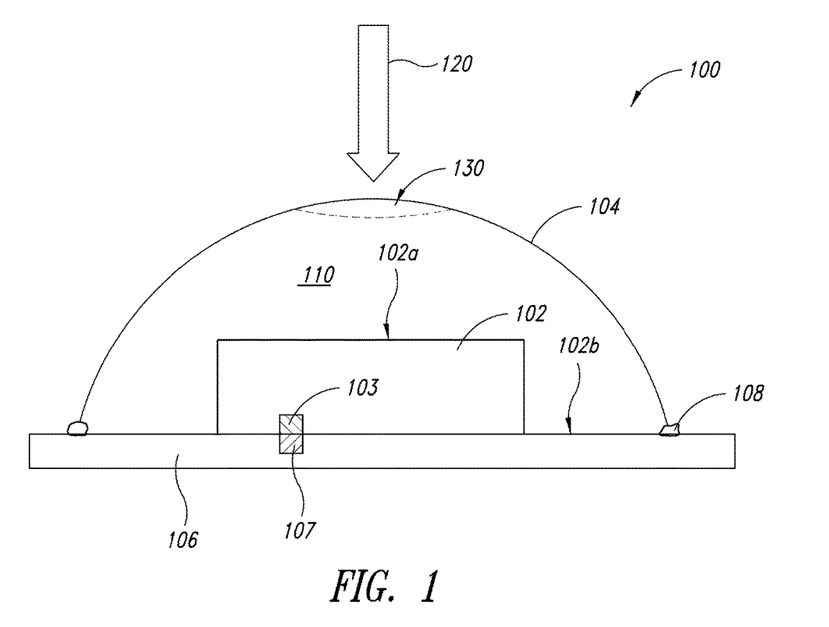
FIG. 1 is a cross-sectional view of an encapsulated pressure sensor, in accordance with one or more embodiments of the present disclosure.

FIG. 1 is a cross-sectional view of an encapsulated pressure sensor 100 according to one embodiment of the present disclosure. The encapsulated pressure sensor 100 includes a pressure sensor 102, a mounting substrate 106 and a deformable encapsulating member 104.

The pressure sensor 102 may be an absolute or barometric pressure sensor, and includes a pressure sensing surface 102a for sensing an applied pressure. One or more pressure sensing surfaces 102a may be included at any outer surface of the pressure sensor 102. As shown in FIG. 1, the pressure sensing surface 102a may be a top surface of the pressure sensor 102.

The pressure sensor 102 includes a mounting surface 102b for mounting the pressure sensor 102 to the mounting substrate 106. As shown in FIG. 1, the mounting surface 102b of the pressure sensor 102 may be opposite the pressure sensing surface 102a; however, other configurations of the mounting surface 102b and the pressure sensing surface 102a are contemplated and may be utilized in accordance with the present disclosure.

The mounting substrate 106 may be any substrate to which the pressure sensor 102 can be mounted and fixed in place. In an embodiment, the mounting substrate 106 is a printed circuit board having one or more input electrodes 107 electrically coupled to one or more output electrodes 103 of the pressure sensor 102 for receiving a signal indicating a sensed pressure from the pressure sensor 102.

The deformable encapsulating member 104 is attached to the mounting substrate 106 in such a way that it encapsulates the mounted pressure sensor 102. The deformable encapsulating member 104 further encapsulates a fluid 110 surrounding at least a portion of the pressure sensing surface 102a of the pressure sensor 102. Thus, as shown in FIG. 1, the pressure sensor 102 and fluid 110 are encapsulated within a volume defined by the deformable encapsulating member 104 and the mounting substrate 106. An adhesive material 108, such as adhesive glue, epoxy, resin or the like, may be used for attaching the deformable encapsulating member 104 to the mounting substrate 106.

The deformable encapsulating member 104 may be made of any material which can be deformed in response to the application of an external force to an outer surface of the deformable encapsulating member 104, and may be or include rubber, plastics or the like. The deformable encapsulating member 104 may be dome shaped, and may be outwardly biased by an ambient hydrostatic pressure of the fluid 110, as shown in FIG. 1. It should be readily understood, however, that various shapes and configurations for the deformable encapsulating member 104 are possible and are contemplated by the present disclosure. For example, the deformable encapsulating member 104 may form a cubic, conical, cylindrical or any other 3-dimensional shape encapsulating the pressure sensor 102 and fluid 110. Support structures (not shown) may be included within the encapsulated area in order to support or bias the deformable encapsulating member 104 into any desired shape.

The fluid 110 may be any fluid which exerts a pressure at equilibrium (i.e., with no external force applied to the deformable encapsulating member 104) on the pressure sensing surface 102a of the pressure sensor 102. In an embodiment, the fluid 110 is air. It should be readily understood, however, that any fluid having a measurable hydrostatic pressure may be used, including various gases and/or liquids. Additionally, the fluid 110 should be a compressible or semi-compressible fluid such that application of an external force 120 will compress the fluid 110, allowing the deformable encapsulating member 104 to deform.

The deformable encapsulating member 104 is fluid impermeable for the fluid it encapsulates, in one embodiment, to ensure that the fluid 110 is effectively sealed within the encapsulated pressure sensor 100. Alternatively, the deformable encapsulating member 104 may be semi-permeable, that will permit some amount of atmospheric air (or other fluid) to permeate the deformable encapsulating member 104, so long as a barometric pressure differential resulting from application of an external force 120 can be sensed by the pressure sensor 102. Namely, the deformable encapsulating member 104 can permit a slow exchange of the fluid 110, such as air. At the moment pressure is applied, the member 104 does not let air leak, since this would affect the pressure measurement, but it may be slightly semi-permeable to permit a small exchange of air in and out over long periods of time.

Referring to FIG. 1, before application of an external force 120, the pressure sensor 102 senses only the hydrostatic pressure of the fluid 110, which is at equilibrium within the encapsulated pressure sensor 100. That is, a steady pressure is applied to the pressure sensing surface 102a of the pressure sensor 102 based on the set pressure applied by the fluid 110. When an external force 120 is applied against the deformable encapsulating member 104, the deformable encapsulating member 104 is deformed inwardly (shown in the deformed state by the dotted line 130), and the fluid 110 is compressed. As the fluid 110 is compressed, the pressure sensor 102 senses an increase in pressure due to the external force 120. The increase in pressure is proportional to, and can serve as a proxy for, the applied external force 120.

Figure 2:
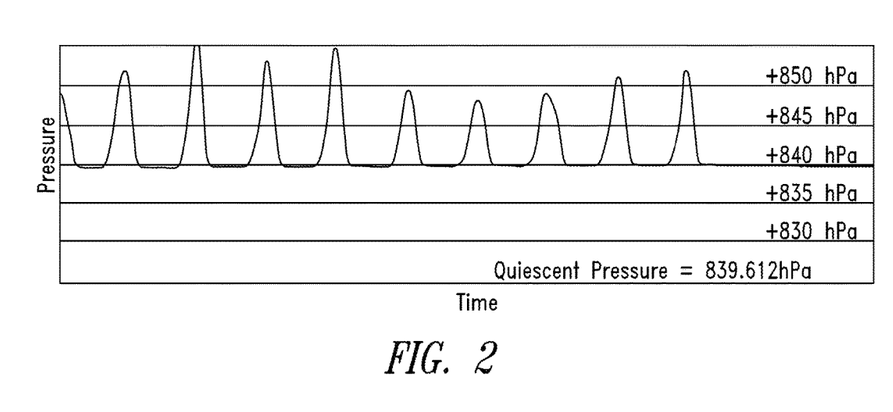
FIG. 2 is a graph illustrating the sensitivity of an encapsulated pressure sensor according to an embodiment, as measured in an experiment.

FIG. 2 is a graph illustrating the sensitivity of an encapsulated pressure sensor 100, as measured in an experiment. In the experiment, a micro-electro-mechanical systems (MEMS) nano pressure sensor known as the "LPS22HB," commercially available from STMicroelectronics™, was used for the pressure sensor 102. The LPS22HB pressure sensor is an absolute pressure sensor having a size of 2.0×2.0×0.76 mm, and an absolute pressure range of 260 to 1260 hPa. Further, the LPS22HB pressure sensor is particularly sensitive, as it can detect pressure gradients of as little as 0.01 hPa, which translates into an atmospheric pressure change corresponding to about 10 cm of elevation change.

The deformable encapsulating member 104 was formed of rubber and shaped as a dome encapsulating the pressure sensor 102, and air was used as the fluid 110. The deformable encapsulating member 104 was sealed to a printed circuit board (PCB), which was used as the mounting substrate 106 in the experiment, using glue 108. During the experiment, ten different external forces were applied to the deformable encapsulating member 104, with the external forces corresponding to weights ranging from 25 g to 35 g. The graph of FIG. 2 reflects the output pressure sensed by the pressure sensor 102 during the experiment, in which ten different forces were applied, each of a slightly different gram-force. A gram-force is the magnitude of force exerted by one gram in an earth gravitation field, which equals 9.806 milliNewtons.

As shown in the graph of FIG. 2, an absolute pressure of about 839.6 hPa was sensed by the pressure sensor 102 in the absence of an external force (i.e., a quiescent pressure) applied to the deformable encapsulating member 104. When an external force was applied (ranging from 25 g to 35 g), the pressure sensor 102 sensed an increase of pressure ranging from just below about 8.4 hPa (i.e., an absolute pressure of about 848 hPa) to just above 15 hPa (i.e., an absolute pressure of just above 855 hPa). From the experiment, it was calculated that the encapsulated pressure sensor 100 has a sensitivity of about 1 hPa of increased sensed pressure per 3 g of applied gram-force.

Figure 3:
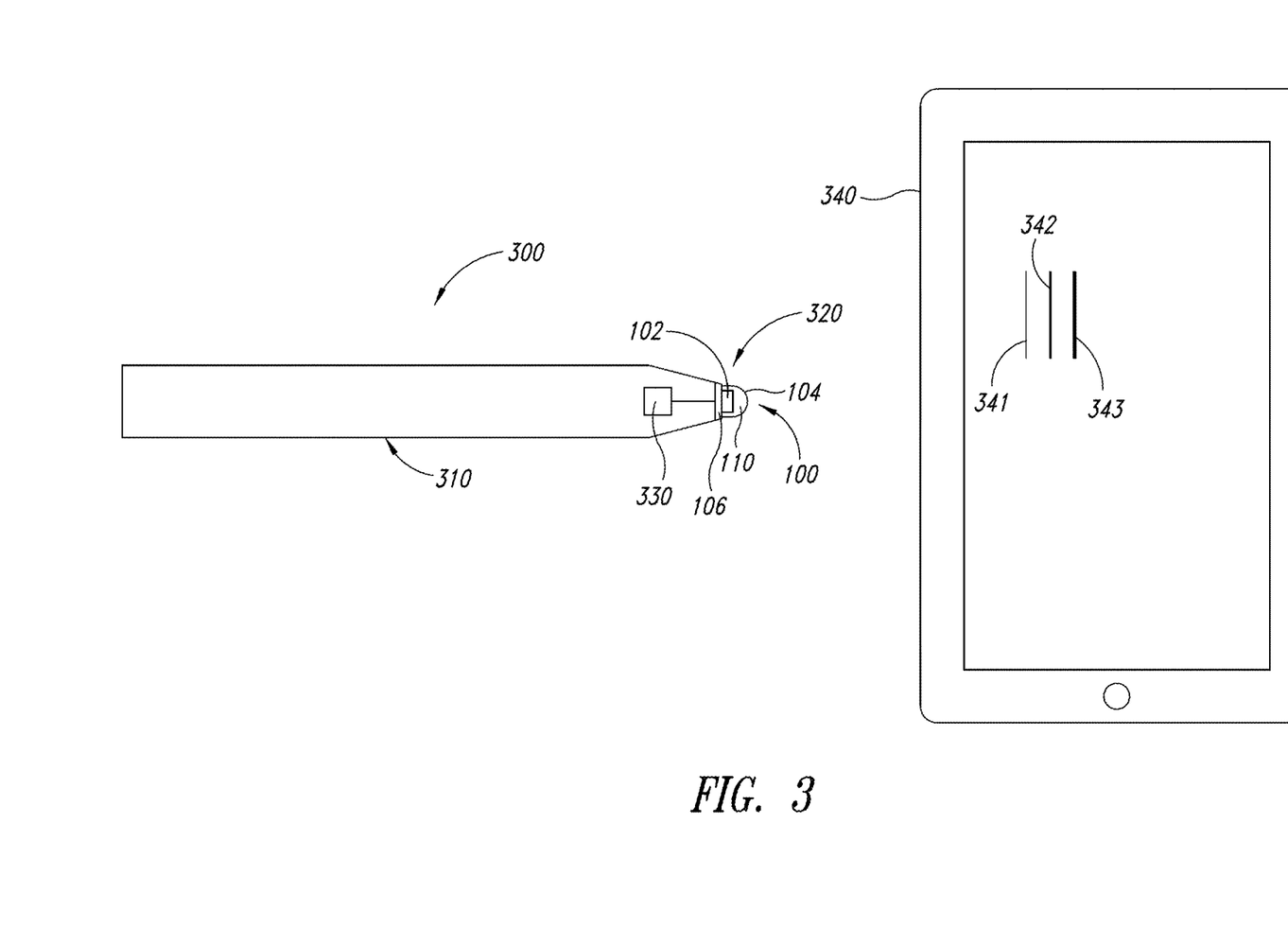
FIG. 3 is a schematic side view representation of a stylus having an encapsulated pressure sensor located at its tip, in accordance with one or more embodiments of the present disclosure.

Encapsulated pressure sensors in accordance with embodiments of the present disclosure can be advantageously employed in a variety of embodiments and applications. In one embodiment, an encapsulated pressure sensor is used in the tip of a stylus or smart pen. FIG. 3 is a view illustrating a stylus 300 and a host electronic device 340, in accordance with one or more embodiments of the present disclosure.

The stylus 300 includes a body 310 and a tip 320. The tip 320 includes an encapsulated pressure sensor 100, which includes a pressure sensor 102, a deformable encapsulating member 104, fluid 110 and a mounting substrate 106, as shown in the encapsulated pressure sensor 100 of FIG. 1.

The encapsulated pressure sensor 100 is electrically coupled (e.g., via one or more electrodes 103) to a stylus processor 330. The stylus processor 330 may be any conventional microprocessor or similar circuitry and may be programmed to receive an output signal from the encapsulated pressure sensor 100 and perform an action based on the received output signal. For example, the stylus processor 330 may communicate with the host electronic device 340, which may be a tablet computer, smart phone, laptop computer or any other electronic device having a display and a processor configured to cause the display to display a mark or line.

When a signal is received from the encapsulated pressure sensor 100 indicating an amount of increase in sensed pressure (i.e., an external force applied to contact the stylus tip 320 against the display of the host electronic device 340), the stylus processor 330 may communicate the sensed increase in pressure to the host electronic device 340, which may cause a mark or line to be displayed on the display of the host electronic device 340. The displayed mark or line may have one or more characteristics (e.g., width, color, brightness, darkness, hue, saturation, etc.) which are variable based on the amount of external force pressing the tip 320 of the stylus 300 (as sensed by the encapsulated pressure sensor 100) against the display of the host electronic device 340. For example, as shown in FIG. 3, lines having varying widths may be displayed, with the line width being based on the amount of pressure applied by the tip 320 against the display of the host electronic device 340. A first line 341 having a thin line width is displayed on the host electronic device 340 when the tip 320 is pressed against the display lightly. Similarly, a second line 342 having an intermediate line width is displayed when the tip 320 is pressed against the display with a medium or intermediate amount of pressure. A third line 343 having a relatively wide line width that is greater than the line widths of the first and second lines 341, 342 is displayed when the tip 320 is pressed against the display with greater pressure than was applied for the first and second lines 341, 342.

The position at which the stylus tip 320 is pressed against the display of the host electronic device 340 may be determined by any conventional means, including, for example, by a touchscreen display having capacitive or other sensing means for determining a location of a touch on the display.

The stylus 300 may further include any conventional components and/or circuitry (such as batteries, communication modules and the like) for operation of the stylus 300 and communication between the stylus 300 and a host electronic device.

Figure 4:
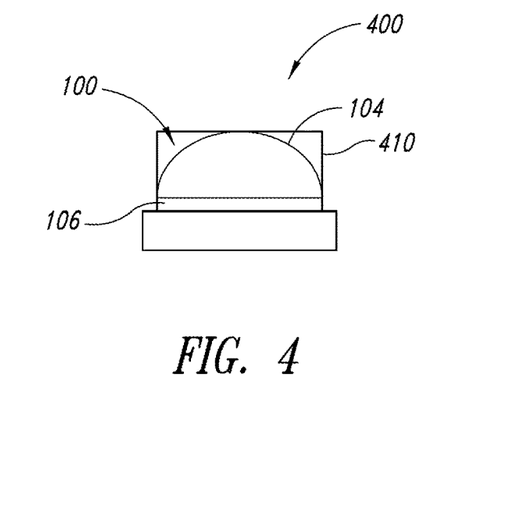
FIG. 4 is a schematic side view representation of a pressure-sensitive button which includes an encapsulated pressure sensor according to one or more embodiments.

FIG. 4 is a schematic side view representation of a pressure-sensitive button 400 which includes an encapsulated pressure sensor 100. The encapsulated pressure sensor 100 may generally include the features of the encapsulated pressure sensor 100 shown in FIG. 1, including a pressure sensor 102, a deformable encapsulating member 104, fluid 110 and a mounting substrate 106. The pressure-sensitive button 400 further includes a shell 410, as an outer housing in one embodiment. The shell 410 is just slightly in contact with the outer surface of the deformable encapsulating member 104. The shell 410 is outwardly biased by spring action or the like in the rest position. The shell 410 may be depressed, thereby pressing into the deformable encapsulating member 104 of the encapsulated pressure sensor 100 and causing an increase in pressure within the encapsulated pressure sensor 100 which is sensed by the pressure sensor 102.

The pressure-sensitive button 400 may not include the shell 410 in all embodiments. The encapsulated pressure sensor 100, for example as shown in FIG. 1, may itself be a pressure-sensitive button, with the deformable encapsulating member 104 serving as a depressible button, without the use of a separate cover or housing.

The pressure-sensitive button 400 may be utilized in a variety of applications with high sensitivity. One such application, for example, is a control device such as a video game controller, a remote control or the like. In such a case, a variation in an applied force to the button 400 can be sensed with a high degree of sensitivity and can cause an electronic device (e.g., a video game console, a TV, a stereo, a personal computer, and so on) to perform an action corresponding to the amount of change in pressure sensed in the encapsulated pressure sensor 401.

Similarly, the pressure-sensitive button 400 may be utilized as a scroll button for an electronic device such as a personal computer, tablet computer, laptop computer or the like. For example, one or more pressure-sensitive buttons 400 may be included on a peripheral device such as a mouse, and a scrolling speed can be proportional to an amount of increase in the pressure sensed by the encapsulated pressure sensor 100.

In another embodiment, one or more encapsulated pressure sensors 100 may be incorporated into a touchscreen device. Some touchscreen devices utilize force sensors to determine an amount of force applied to the touchscreen, in conjunction with conventional capacitive, resistive or other touchscreen technologies for determining a location of the applied touch. An encapsulated pressure sensor 100 in accordance with this disclosure, however, may provide significantly better sensitivity than a conventional force sensor.

Figure 5:
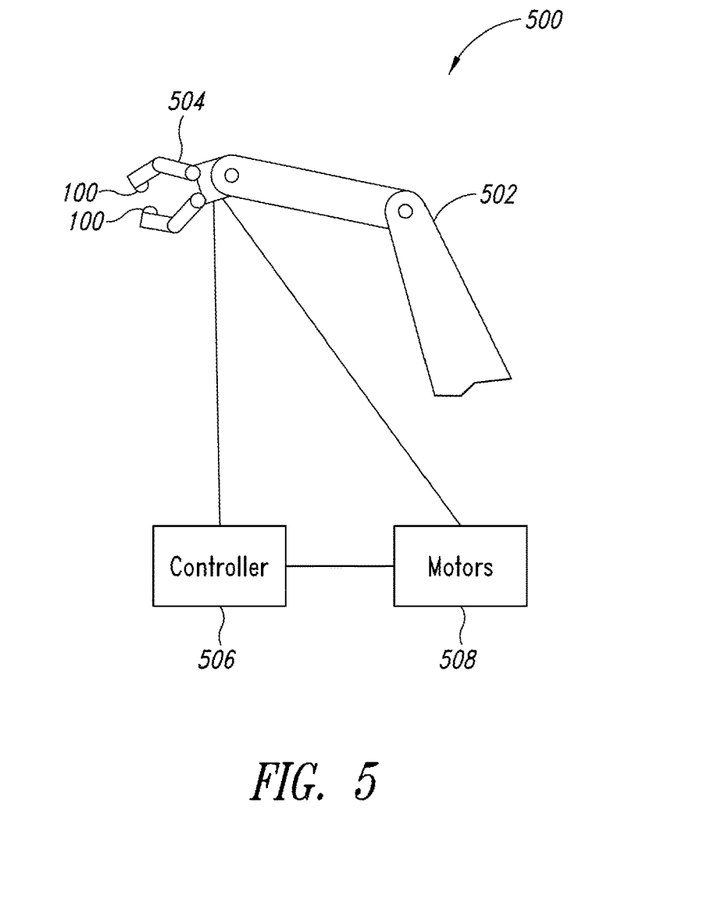
FIG. 5 is a schematic side view representation of a robotic arm that includes one or more encapsulated pressure sensors for sensing an applied gripping force, in accordance with one or more embodiments.

FIG. 5 is a schematic side view representation of a robotic arm 500 that includes one or more encapsulated pressure sensors 100 for sensing an applied gripping force. The encapsulated pressure sensors 100 may be the encapsulated pressure sensor 100 shown in FIG. 1, and may include, for example, a pressure sensor 102, a deformable encapsulating member 104, fluid 110 and a mounting substrate 106.

The robotic arm 500 may include a movable arm 502 and one or more movable gripping devices 504 coupled to the movable arm 502, such as fingers, a claw or any movable mechanism for applying a gripping force to grip an object.

The robotic arm 500, including the movable arm 502 and the movable gripping devices 504, is coupled to one or more motors 508 which physically cause the movable arm 502 and the movable gripping devices 504 to move. The movable arm 502 and the gripping devices 504 may include one or more joints or rotation points allowing the motors 508 to move the movable arm 502 and gripping devices 504.

A controller 506, including control circuitry such as a processor, an application-specific integrated circuit (ASIC) or the like, is coupled to the encapsulated pressure sensors 100 and receives signals from the encapsulated pressure sensors 100 indicating a gripping force (e.g., as may be determined from a sensed increase in pressure by the pressure sensor 102) applied by the gripping devices 504 to, for example, an object being gripped.

The controller 506 is further coupled to the one or more motors 508, and controls the movement of the gripping devices 504 and the movable arm 502, for example, by providing a movement control signal to the motors 508. The movement control signal provided from the controller 506 to the motors 508 may be based on the sensed gripping pressure signals received from the one or more encapsulated pressure sensors 100, such that the gripping force of the movable gripping devices 504 may be controlled through a feedback loop, i.e., the actual gripping force is provided as feedback to the controller 506 which then provides a gripping control signal (or movement signal) to the gripping devices 504 to control its gripping force (e.g, to increase, decrease, maintain, etc.) based on its sensed gripping force.

Figure 6:
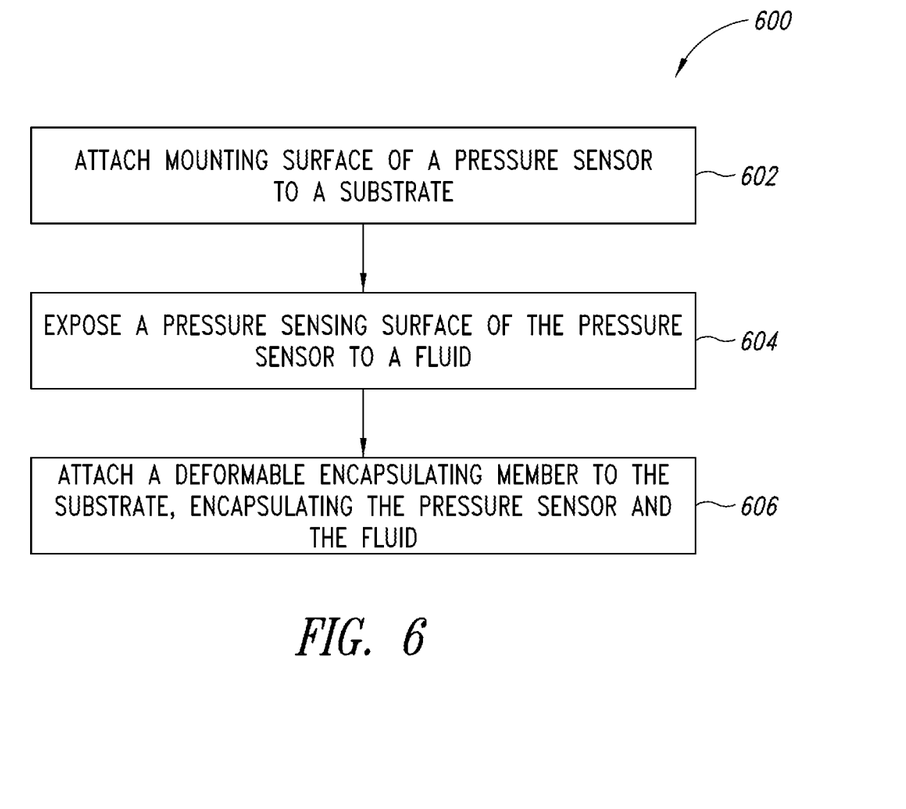
FIG. 6 is a flowchart illustrating a method of making an encapsulated pressure sensor, such as the encapsulated pressure sensor shown in FIG. 1, in accordance with one or more embodiments.

FIG. 6 is a flowchart illustrating a method 600 of making an encapsulated pressure sensor, such as the encapsulated pressure sensor 100 shown in FIG. 1. At block 602, the method begins by attaching a mounting surface 102b of a pressure sensor 102 to a mounting substrate 106. The mounting surface 102b of the pressure sensor 102 may include one or more electrodes 103, which may be aligned with one or more electrodes 107 of the mounting substrate when the pressure sensor 102 is attached to the mounting substrate 106. The pressure sensor 102 may be attached to the mounting substrate 106 using any adhesive, and in one or more embodiments, the adhesive is glue.

At block 604, the pressure sensing surface 102a of the pressure sensor 102 is exposed to a fluid 110. The fluid 110 may be any compressible or semi-compressible fluid for imparting a hydrostatic pressure to the pressure sensing surface 102a of the pressure sensor 102. In one or more embodiments, the fluid 110 may be air.

At block 606, a deformable encapsulating member 104 is attached to the mounting substrate 106 such that it encapsulates the pressure sensor 102 and the fluid 110. The deformable encapsulating member 104 may be made of any deformable material, and in one or more embodiments the deformable encapsulating member 104 includes a rubber material. The deformable encapsulating member 104 may be attached to the mounting substrate 106 using any adhesive material, which may be, for example, glue.

The encapsulated pressure sensors provided in this disclosure offer several significant advantages over conventional force sensing devices, which are used in a wide variety of applications. One such advantage is the high degree of sensitivity which may be achieved with the encapsulated pressure sensor 100. Another advantage is that the encapsulated pressure sensor 100 consumes very little power compared to conventional force sensing devices, as the encapsulated pressure sensor 100 consumes very low current.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pressure sensor assembly, comprising:
   a mounting substrate having a surface and an input electrode on the surface;
   a pressure sensor directly attached to the surface of the mounting substrate, the pressure sensor having a pressure sensing surface and an output electrode opposite the pressure sensing surface, the output electrode positioned on and electrically coupled to the input electrode on the surface of the mounting substrate;
   a deformable encapsulating member directly attached to the surface of the mounting substrate and encapsulating the pressure sensor, the surface of the mounting substrate being a continuous surface in a region where the deformable encapsulating member and the pressure sensor are attached; and
   a fluid encapsulated within the pressure sensor assembly by the deformable encapsulating member, and contacting the pressure sensing surface of the pressure sensor.

2. The pressure sensor assembly of claim 1, wherein the fluid comprises air.

3. The pressure sensor assembly of claim 1, wherein the deformable encapsulating member comprises rubber.

4. The pressure sensor assembly of claim 1, wherein the mounting substrate is a printed circuit board.

5. The pressure sensor assembly of claim 1, wherein the pressure sensor is an absolute pressure sensor.

6. The pressure sensor assembly of claim 5, wherein the absolute pressure sensor has a sensitivity of at least 1 hPa of increased sensed pressure per 3 g of applied force.

7. The pressure sensor assembly of claim 1, further comprising a depressable button covering the deformable encapsulating member, the depressable button being configured to contact the deformable encapsulating member when depressed by an external force.

8. A method, comprising:
   providing an encapsulated pressure sensor, the encapsulated pressure sensor including:
      a pressure sensor including a pressure sensing surface and a mounting surface opposite the pressure sensing surface, the mounting surface being directly attached to a surface of a mounting substrate, the pressure sensor having a output electrode on the mounting surface that is positioned on and electrically coupled to an input electrode on the surface of the mounting substrate,
      a fluid contacting the pressure sensing surface of the pressure sensor, and
      a deformable encapsulating member, the deformable encapsulating member being directly attached to the surface of the mounting substrate and encapsulating the pressure sensor and the fluid, the surface of the mounting substrate being a continuous surface in a region where the deformable encapsulating member and the pressure sensor are attached, the deformable encapsulating member being spaced laterally apart from the pressure sensor along the surface of the mounting substrate;
   sensing by the pressure sensor a pressure exerted on the pressure sensing surface by the fluid in an equilibrium state; and
   sensing by the pressure sensor an increase in pressure exerted on the pressure sensing surface by the fluid due to an external force exerted on the deformable encapsulating member.

9. The method of claim 8, wherein sensing by the pressure sensor a pressure exerted on the pressure sensing surface by the fluid in an equilibrium state includes sensing an absolute pressure.

10. The method of claim 8, further comprising:
    determining a value of the external force based on the sensed increase in pressure.

11. A system, comprising:
    an electronic stylus including:
       a body;
       a tip including an encapsulated pressure sensor, the encapsulated pressure sensor including:
          a pressure sensor including a pressure sensing surface and a mounting surface opposite the pressure sensing surface, the mounting surface being directly attached to a surface of a mounting substrate, the pressure sensor having an output electrode on the mounting surface that is positioned on and electrically coupled to an input electrode on the surface of the mounting substrate, the surface of the mounting substrate being a continuous surface in a region where the mounting surface of the pressure sensor is attached,
          a fluid contacting the pressure sensing surface of the pressure sensor, and
          a deformable encapsulating member directly attached to the surface of the mounting substrate and encapsulating the pressure sensor and the fluid; and
       a stylus processor configured to receive an output signal from the pressure sensor indicative of a sensed pressure corresponding to an external force applied to the deformable encapsulating member.

12. The system of claim 11, further comprising:
    a host electronic device including a display, the host electronic device being communicatively coupled to the stylus processor and configured to display a mark on the display based at least in part on the output signal from the pressure sensor.

13. The system of claim 11, wherein the host electronic device is configured to display the mark having at least one of a width, color, brightness, darkness, hue and saturation based on the output signal from the pressure sensor.

14. The system of claim 11, wherein the host electronic device is configured to display the mark having a stroke width based on the output signal from the pressure sensor.

15. A system, comprising:
    a robotic arm having a movable gripping device, the movable gripping device including an encapsulated pressure sensor on a gripping surface of the movable gripping device and configured to sense a gripping force, the encapsulated pressure sensor including:
       a pressure sensor having a pressure sensing surface and a mounting surface opposite the pressure sensing surface, the mounting surface being attached to a mounting substrate, the pressure sensor having an output electrode on the mounting surface that is positioned on and electrically coupled to an input electrode on a surface of the mounting substrate,
       a fluid contacting the pressure sensing surface of the pressure sensor, and
       a deformable encapsulating member attached to the mounting substrate and encapsulating the pressure sensor and the fluid, the deformable encapsulating member configured to contact a gripped object and to sense the gripping force applied to the gripped object; and a controller coupled to the encapsulated pressure sensor, the controller being configured to receive a signal indicative of the sensed gripping force and to control a movement of the movable gripping device based on the sensed gripping force.

16. The system of claim 15, further comprising:
one or more motors coupled to the movable gripping device and configured to move the gripping device based on a control signal received from the controller.

17. A method, comprising:
attaching a first surface of a pressure sensor directly to a surface of a mounting substrate, the surface of the mounting substrate being a continuous surface in a region between the mounting substrate and the first surface of the pressure sensor, the pressure sensor having an output electrode on the first surface that is positioned on and electrically coupled to an input electrode on the surface of the mounting substrate;
exposing a second surface of the pressure sensor to a fluid, the second surface being opposite to the first surface; and
attaching a deformable encapsulating member directly to the surface of the mounting substrate, the deformable encapsulating member encapsulating the pressure sensor and the fluid.

18. The method of claim 17, wherein attaching the first surface of the pressure sensor directly to the surface of the mounting substrate includes attaching the first surface of the pressure sensor directly to the surface of the mounting substrate with glue.

19. The method of claim 17, wherein exposing the second surface of the pressure sensor to a fluid includes exposing the second surface of the pressure sensor to air.

20. The method of claim 17, wherein the mounting substrate is a printed circuit board.

* * * * *